UNITED STATES PATENT OFFICE.

WALTER AUGUST SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR OBTAINING CHLORIDS OF POTASSIUM OR OTHER METALS.

1,367,836.  Specification of Letters Patent.  Patented Feb. 8, 1921.

No Drawing.  Application filed April 29, 1918. Serial No. 231,459.

*To all whom it may concern:*

Be it known that I, WALTER AUGUST SCHMIDT, a citizen of the United States, residing at Los Angeles, in the county of Los Angeles and State of California, have invented a new and useful Process for Obtaining Chlorids of Potassium or other Metals, of which the following is a specification.

This invention relates to the separation of minerals by volatilization, and particularly to the recovery of alkali metal chlorids from complex mixtures of alkali metal salts, including, for example, sulfates and chlorids from bittern or mother liquor remaining as a residual product after crystallization of the sodium chlorid from salt solutions such as brine from saline lakes. Such residual product generally contains, along with other contituents, sodium chlorid, sodium sulfate, potassium chlorid, potassium sulfate, magnesium chlorid and magnesium sulfate in various proportions. The separation of alkali metal chlorids from the sulfates and other constituents by fractional crystallization, is a matter of great difficulty and has not heretofore been successfully carried out. The most valuable constituent of these complex solutions is the potassium compound present, and numerous attempts have been made at large expense to separate the same, by fractional crystallization, or otherwise, from the remainder of the salts present. These attempts have heretofore been without commercial success, as the potassium chlorid can not be effectively crystallized out from the remainder of the salts present. On the other hand, separation of potassium chlorid from sodium chlorid in solution is a comparatively easy process, provided sulfates and magnesium salts are absent and the main object of the present invention in this connection is to provide for separation of the alkali metal chlorids from the sulfates and magnesium salts with the view to later separation, if desired, of the potassium chlorid from the sodium chlorid.

I have found that by subjecting the mixture of alkali metal chlorids and sulfates and magnesium salts to a sufficient temperature, that substantially all of the chlorid constituent of the mixture can be volatilized, substantially all the sulfates and magnesium salts remaining behind, and that the portion of the mixture so volatilized, consists mainly of potassium chlorid and sodium chlorid. In general, however, a considerable proportion of the potassium present will remain unvolatilized, for example, in the form of sulfate, provided that the temperature is not sufficiently high to cause volatilization of any substantial amount of sulfates and magnesium salts present. In order to recover the potassium compound remaining as sulfate in the residue, I prefer to add or feed in continuously or intermittently a certain amount of sodium chlorid to the residue and continue or repeat the heating operation to drive off a further quantity of chlorids. The mixing of the sodium chlorid may be effected continuously during the heating operation, or said salt may be mixed with the residue between successive heating operations. In the heating operations above referred to with an added quantity of sodium chlorid there is exchange of chlorin between the sodium chlorid added and the potassium present as sulfate, resulting in the production of a certain amount of potassium chlorid and a corresponding amount of sodium sulfate. The sodium sulfate so formed remains in the residue and the potassium chlorid so formed is volatilized. Such reheating, with additional sodium chlorid, may be repeated if necessary, until the amount of potassium remaining in the residue is reduced to a limit below which it is not commercially advantageous to proceed. Other reactions may take place during the above described operations, for example, under some conditions, hydrochloric acid is formed, apparently by decomposition of some of the magnesium salts present.

The potassium and sodium chlorids volatilized in the manner above described, may be collected as fume in any suitable manner, for example, by electrical precipitation, according to the Cottrell process, and the material so collected may be treated with water and the potassium and sodium chlorid separated, for example, by evaporation and alternate heating and cooling, in well known manner, so as to crystallize out the potassium and sodium chlorids at different stages of the operation. The sodium chlorid so recovered from the volatilized and precipitated material may be returned to the heating stage of the process, in cyclic operation, for treatment of a further quantity of material, sufficient additional sodium chlorid, being added to make up for loss during the operation.

The process above described may be carried out in any suitable apparatus, the heating operation being effected, for example, in a multiple hearth furnace of any usual type, either direct fired or muffle fired, and with the heat applied at any one or more of the hearths, so as to provide for proper control of the temperature, and the bittern or the salt residue produced by evaporation thereof to dryness being fed in at the top of the multiple hearth furnace and being rabbled from hearth to hearth in the usual manner, and subjected to heat in passing over the hearths. Additional sodium chlorid may be supplied at any one or more of the hearths, by suitable feeding means. The volatilized chlorids are drawn from the upper part of the furnace to a suitable collecting means, either by the operation of natural draft, or by a suitable fan or blower.

The vapors resulting from heating the salts with sodium chlorid in the manner above set forth, may be condensed by cooling in any suitable manner and the resulting product collected in any suitable collecting apparatus, preferably an electrical precipitator. In this connection the fact that a considerable quantity of hydrochloric acid is in some cases formed in the fuming operation, tends to facilitate the deposition of the product in an electrical precipitator.

Any other suitable means may be used for heating the materials, in carrying out my process. For example, a rotary kiln may be used, connected to an electrical precipitator, in the manner shown in Patent No. 1,200,887, granted to me October 10, 1916, the bittern and sodium chlorid being fed in at the upper end of the kiln—or a reverberatory furnace may be used, provided with a series of chambers or hearths, either with independent burner or grate means, or adapted to receive the hot gases successively from a single burner or grate, using in either case, either coal or oil as fuel. The salts may be supplied in these chambers or hearths through an overhead door in the arched roof over the same, and each hearth may be dished to hold the charges separate during each heating stage. Each charge, after heating for a sufficient time to complete the volatilization for that stage, may be rabbled out through a side door of the hearth, mixed with a further amount of sodium chlorid, and introduced into the next hearth and so on until the process is completed. Or, if desired, the heating operation can be effected in crucibles or in a furnace of the muffle fired type, provision being made for drawing off the volatilized material; for example, by connecting a flue leading from the crucible or muffle to a fan which draws or forces the vapor from the volatilizing means to a suitable precipitator. In such an application of the invention, the addition of sodium chlorid required for completing the volatilization of the potassium, may, in some cases, be conveniently effected by vaporizing such sodium chlorid in a suitable furnace and leading the vapor into or through the heated salts, the fact that at the preferred temperature of reaction (about 1000° C.) the residue assumes a condition of porous clinker, facilitating such passage of the sodium chlorid vapor therethrough.

In any furnace or crucible used for carrying out the above described operations, the hearth or other part which is in direct contact with the heated material or with the vapors thereof should be composed of basic material such as magnesia or the like, so as not to be attacked by the alkali metal compounds present.

My process may be carried out as follows:

The dry salts resulting from evaporation to dryness of bittern or like material, or, if desired, the bittern itself, are placed in a furnace with or without the addition of sodium chlorid, as hereinafter explained and heated by means of burners or otherwise so as to bring the material to a temperature of about 900° to 1100° and the material is maintained at this temperature for a sufficient time to cause volatilization of substantially all of the chlorid content as hereinafter set forth. The potassium and sodium chlorids being more volatile than the sulfates present, the volatilization is largely selective, especially in the case of potassium chlorid, which is more volatile than sodium chlorid. If there is sufficient excess of sodium chlorid present, the volatilization may proceed until the potassium is volatilized to an extent sufficient for commercial recovery, any potassium sulfate present reacting with the remaining sodium chlorid to form potassium chlorid, which is volatilized, and the sodium sulfate, which remains in the residue. The proportions of the several salts, potassium chlorid, sodium chlorid, potassium sulfate and sodium sulfate, will, under conditions of sufficient heat, produce reaction to equilibrium or to completion, and by adding sufficient sodium chlorid, the amount of potassium sulfate remaining in the residue, may be reduced to any desired extent. If the amount of sodium chlorid present in the original salt is not sufficient to provide for elimination of potassium compound to the desired extent, a further amount of sodium chlorid may be added before or during heating of the salt.

In carrying out my process, I may add the sodium chlorid in successive stages, in the following manner: The original salt having been heated for a sufficient time and at such temperature as to volatilize as much as possible of potassium in the form of chlorid, is then allowed to cool and an additional amount of sodium chlorid is added thereto, either by grinding the solid sodium chlorid with the residue or by quenching the hot residue with sodium chlorid solution, the latter procedure being advantageous in producing a more thorough distribution of the sodium chlorid throughout the mass. In this connection it may be stated that at the temperature most suitable for the volatilization, namely, about 1000° C., the salts referred to do not fuse, but assume a condition of porous clinker, so that distribution of the sodium chlorid with the residue is advantageously effected by quenching with the solution or by grinding the sodium chlorid with such residue as above stated. The mixture of the residue and the additional sodium chlorid is then reheated or calcined for volatilization of a further quantity of potassium chlorid, the added sodium chlorid reacting with a portion of the potassium sulfate remaining in the residue and the resulting potassium chlorid being partly volatilized in such recalcination. By repeating this operation of adding sodium chlorid and reheating a sufficient number of times, the potassium content of the residue may be reduced to any desired extent. The fumes or vapors from all of these heating operations may be conducted to any suitable cleaning apparatus, either scrubbing or washing towers or other apparatus for absorbing the soluble potassium chlorid in water or electrical precipitators for precipitating the potassium chlorid in solid form, or a combination of such apparatus, operating both by absorption in water and by electrical precipitation.

In some cases calcium chlorid may be used instead of sodium chlorid, to increase the volatilization of potassium chlorid, it being understood that in this case the calcium salts may remain mostly in the residue. My process is also applicable to recovery of other metallic chlorids more volatile than sodium chlorid. For example, it may be applied to volatilization of copper as chlorid from copper ores, the said ore being heated in the presence of sodium chlorid, or of sodium chlorid vapor so as to form cupric chlorid which volatilizes and sodium sulfate, for example, which remains in the residue. In this case, also the sodium chlorid is preferably supplied continuously or intermittently, during the heating operation, so as to continue to supply sodium chlorid to the ore, as the copper chlorid is volatilized, until the required amount of the copper content of the ore is driven off and collected, such collection being effected by electrical precipitation, by washing or otherwise. The heating operation may be carried on in a multiple hearth furnace, of the Herreshoff type, or the like, the copper ore being fed in at the top hearth and the sodium chlorid being fed in at several of the intermediate hearths. The sodium chlorid volatilized with the copper chlorid may be separated therefrom by solution and crystallization, or otherwise, and used in cyclic operation of the process.

Silver ores and lead ores, or complex ores of silver, copper and lead may also be treated by this process, the amount of sodium chlorid added and temperature of volatilization being controlled in each case to produce the required volatilization. For silver chlorid volatilization a relatively high temperature will be required, and the furnace used must be such as to operate at such temperature. In such cases a rotary kiln may be used as above described. The chlorids volatilized from complex ores of silver, copper and lead may be condensed in stages by successive cooling operations, and the resulting condensed materials collected or precipitated at each stage, so as to effect more or less separation of such metals. In any case it is desirable to use more sodium chlorid than corresponds theoretically to the amount of copper, silver or lead, etc., as higher recoveries are thereby attained.

What I claim is:

1. The process for recovering potassium chlorid from material containing alkali metal chlorids and sulfates which consists in subjecting the mixture to the action of heat at a sufficient temperature to volatilize potassium chlorid, sufficient sodium chlorid being present to react with the potassium sulfate present in the salt to convert the same into potassium chlorid and to cause volatilization of substantially all of the potassium as potassium chlorid.

2. The process of recovering potassium chlorid from material containing potassium chlorid and potassium sulfate and also containing other salts, which consists in heating such material to a sufficient temperature to volatilize potassium chlorid, sodium chlorid being added to the material to convert potassium sulfate to potassium chlorid and collecting the potassium chlorid thereby volatilized.

3. The process of recovering potassium chlorid from a material containing alkali metal chlorids and sulfates, which consists in subjecting the said mixture to sufficient heat to volatilize alkaline chlorids but not to volatilize sulfates, sodium chlorid being added to the material during the heating thereof and applying heat to volatilize a further quantity of potassium chlorid and collecting the volatilized potassium chlorid.

4. The process of recovering potassium chlorid from a material containing alkali metal chlorids and sulfates, which consists in heating such material to a temperature of about 1000° C. to volatilize potassium chlorid adding sodium chlorid and continuing to heat the material to volatilize a further quantity of potassium chlorid, collecting the potassium chlorid as volatilized.

5. The process of recovering from material containing alkali metal chlorids and sulfates, a chlorid more volatile than sodium chlorid, which consists in subjecting such material to sufficient heat to volatilize the desired chlorid, sodium chlorid being added to the material to increase volatilization of the desired chlorid.

6. The process of recovering potassium chlorid from material containing alkali metal chlorids and sulfates, which consists in adding to such material a chlorid less volatile than potassium chlorid, and capable, when heated, of reacting with potassium sulfate to cause formation of potassium chlorid, subjecting the mixture to sufficient heat to volatilize potassium chlorid and collecting the potassium chlorid so volatilized.

7. The process of recovering potassium chlorid from materials containing alkali metal chlorids and sulfates, which consists in subjecting such material to sufficient heat to volatilize potassium and sodium chlorids, collecting the chlorids so volatilized and separating potassium chlorid therefrom, returning sodium chlorid contained in the material so collected, to the heating stage of the process in cyclic operation for reaction with potassium sulfate to cause production and volatilization of a further amount of potassium chlorid.

8. The process which consists in heating a material containing potassium sulfate in the presence of sodium chlorid, to a temperature sufficient to cause production and volatilization of potassium chlorid, and then supplying to the compound a further quantity of sodium chlorid and subjecting the same to further heating to volatilize a further quantity of potassium chlorid, and continuing such operation until the required amount of potassium is removed from the material containing same.

In testimony whereof I have hereunto subscribed my name this 19th day of April 1918.

WALTER AUGUST SCHMIDT.